Jan. 3, 1928.
B. R. HERRING
COFFEEPOT
Filed Dec. 13, 1926
1,655,014
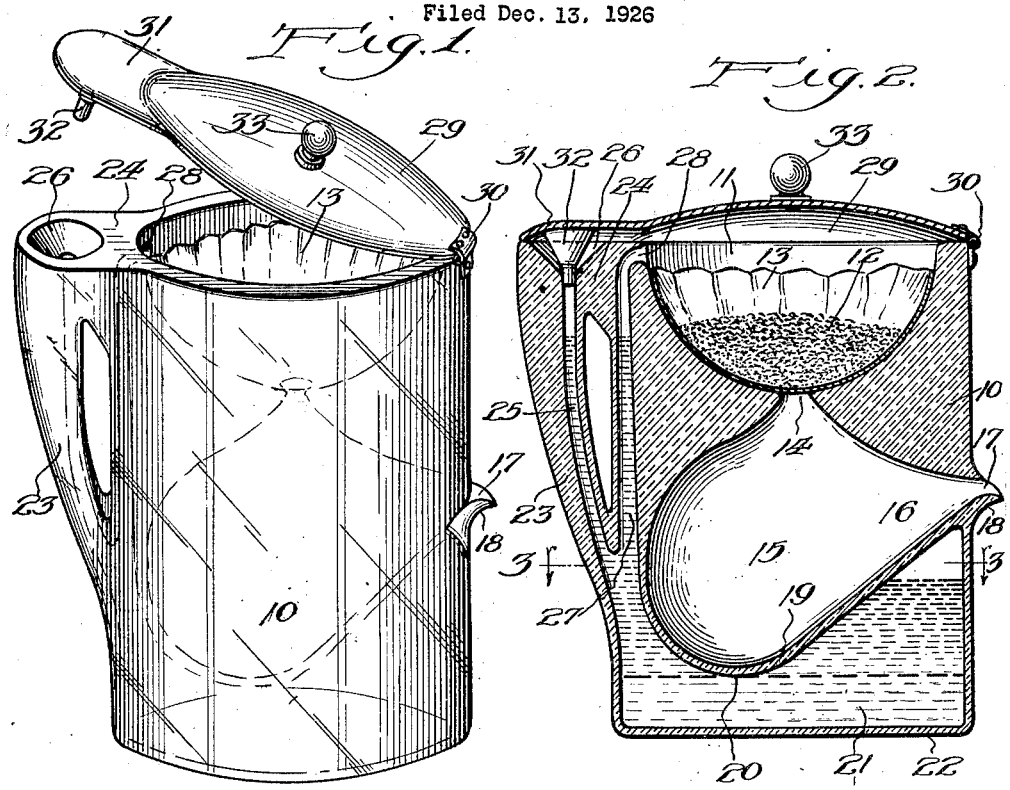
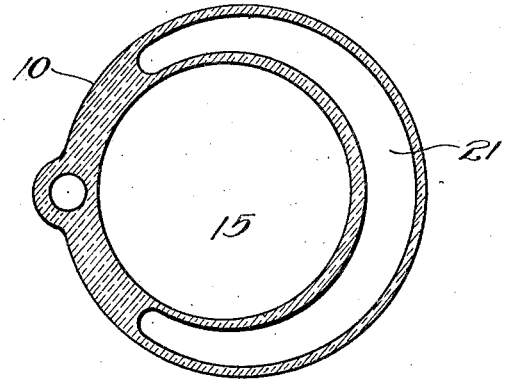
Inventor:
Burton R. Herring,
by Henning & Henning
Atty.

Patented Jan. 3, 1928.

1,655,014

UNITED STATES PATENT OFFICE.

BURTON R. HERRING, OF CHICAGO, ILLINOIS.

COFFEEPOT.

Application filed December 13, 1926. Serial No. 154,332.

The present invention is directed to a coffee pot which is preferably integrally made of glass, although it may be of porcelain or other materials, and in which provision is made for the pouring of the water in a receptacle in the base of the coffee pot and there subjecting it to boiling temperature under such conditions that as soon as water is brought to a boil, and steam is generated, it will serve to suddenly eject the boiling water onto the ground or powdered coffee housed in the upper portion of the coffee pot in position to permit the boiling water to strain or percolate through the coffee and into an interior receptacle for containing the infusion of coffee ready for pouring.

The pot as a whole is so designed that only the proper amount of water can be employed in the preparation of the coffee, and so that every part of the coffee pot, in which coffee grounds or the like might tend to accumulate, will be accessible for cleaning or scouring. The coffee pot is preferably constructed of glass in order to permit observation of the process under way in the preparation of the coffee, and in order to enhance the attractiveness of the coffee pot as an article for table service.

Further objects and details will appear from a description of the invention in connection with the accompanying drawings, wherein—

Figure 1 is a perspective view of the coffee pot of the present invention;

Fig. 2 is a sectional elevation thereof showing the position occupied by the water before boiling; and Fig. 3 is a cross sectional view taken on line 3—3 of Fig. 2.

The coffee pot as a whole comprises a generally cylindrical body 10 preferably formed of glass, which body is provided in its upper portion with a hemi-spherical upper cavity 11 which is cored or cast in the glass body, and which is designed to contain the charge 12 of coffee grounds or powder, which charge is preferably poured into a paper filter 13 of generally bowl shaped formation with its center immediately above an orifice 14 which leads to a lower chamber 15 cored or hollowed out in the interior of the coffee pot, which chamber is preferably tapered or elongated laterally as at 16 and terminates in a spout 17 having a lower lip 18 projecting outwardly from the side of the coffee pot about midway from top to bottom thereof.

The lower chamber 15 is of rounded configuration and is provided with a relatively thin lower or base wall 19 of downwardly bulging formation having its extreme depression at the point 20, and below and around the lower portion of the chamber 15 is formed a water chamber 21 of partially annular formation in the upper portion which surrounds the wall 19 and of fully cylindrical formation in its lower or base portion immediately above the bottom 22 of the coffee pot.

On the rear side of the pot opposite to the spout 17 is a handle 23 which merges into the side of the body at a point near the base thereof, and which at its upper end is connected with the body by a bridge portion 24, the top of which is flush with the top rim of the body. The handle is provided with a port or passage 25 communicating at its lower end with the water chamber in the body, and flared at its upper end to afford a mouth 26 into which the water may be poured.

Inside of the body, and in adjacent relation to the handle, is a vertically extending tubular channel 27 which, at its lower end, communicates with the water chamber at a point adjacent to the lower end of the port or channel 25, and the upper end of the channel 27 is inwardly turned to afford a discharge opening 28 for ejecting boiling water into the upper chamber and above the dry coffee therein contained.

The upper end of the coffee pot is closed by means of a lid 29 which is preferably connected by means of a hinge 30 to the front edge of the coffee pot, and the lid is provided on its rear side with an extension 31 which overlies the upper end of the handle, which extension is provided with a depending plug 32 adapted, when the lid is lowered, to register with the upper end of the water passage 25 so as to close the same against the ejection of water through said passage. The lid is preferably provided with a knob 33 and the lid as a whole is preferably constructed of silver or other metal, although it might be made of glass, if so desired.

In use, a charge of coffee grounds or powder, in determined amount, is poured into the bowl shaped paper filter, and water is then poured into the water inlet passage 25. As soon as the water rises above the downwardly protruding base of the lower chamber 15, that is above the point 20, a water seal will be established which traps a quantity of air in the water chamber, and thereafter the continued pouring of water will cause a compression of the air until the air pressure becomes sufficient to prevent the further rise of water in the water chamber after which continued pouring will simply have the effect of filling up the small inlet passage 25, and the discharge passage 27.

Thereafter if the coffee pot is placed upon a burner, the rise in temperature will first effect a slight expansion of the trapped air in the upper part of the water chamber, which may have the effect of forcing out a small amount of water from the water discharge passage 27, and which will serve to preliminarily moisten the dry coffee in the upper chamber. As soon, however, as the water is brought to boiling temperature, the sudden release of steam into the upper portion of the chamber will have the effect of suddenly ejecting the main body of water in the water chamber, thereby forcing boiling water in substantial volume up through the discharge passage 27 and onto the charge of coffee, and such ejectment of water under steam pressure will continue until the water has been lowered to the level of the base of the lower chamber 15, as indicated by a heavy broken line in Fig. 2, after which the air trap or seal will be broken and little, if any, additional water will be ejected. Thereafter, after the trap or seal is broken, steam will continue to be formed in the water chamber and escape through the passage 27 into the upper cavity where the ground or powdered coffee is contained.

By properly proportioning the capacity of the water chamber, the amount of water ejected up and over the coffee powder may be exactly regulated, so that the dry or slightly moistened coffee will be suddenly merged in a predetermined volume of boiling water which will seep or percolate through the coffee, and through the filter paper thereby securing a proper infusion of the coffee under proper conditions to secure and retain the flavor and aroma.

The water, filtering through the powdered coffee will drain down into the lower chamber 15 which will maintain a temperature slightly below the boiling point of water, so that the coffee infusion will be maintained at the correct temperature to preserve the flavor and aroma until poured out of the spout.

By integrally forming the coffee pot and coring out the interior in the manner indicated, and by forming the pot as a whole of glass or porcelain, it will serve to retain a sufficiently high temperature to maintain the coffee in proper condition for a considerable period of time, and at the same time the pot as a whole will be free from joints or connections, and by retaining the rounded configuration of the chamber, no opportunity will be afforded for the accumulation of sediment. At the same time, the configuration of the interior chamber is such as to permit easy access to all portions thereof for the purpose of cleaning or scouring.

Furthermore, by forming or molding the coffee pot of glass, it will be possible to observe the action going on in the interior of the pot, which will tend to attract interest and attention to the coffee making operation and add to the attractiveness of the device for table service. The device as a whole is entirely self-contained and enables the coffee to be prepared in a certain and exact manner and without the necessity for any great care or attention after the proper amount of coffee powder has been deposited and the pot filled to its capacity with water.

I claim:

1. A coffee pot integrally formed of vitreous material and comprising an upper bowl shaped chamber for coffee and a lower chamber of generally globular formation communicating with the upper chamber, the lower chamber terminating at one side in a laterally opening spout, and the base of the pot, below and partially around the globular lower chamber, constituting a water chamber, the wall of the globular lower chamber protruding downwardly into the water chamber to afford a water seal adapted to trap air in the upper portion of the water chamber when water is admitted, and a discharge passage for boiling water leading upwardly from the water chamber and terminating above the upper bowl shaped chamber and adapted to provide for the discharge of water under pressure of steam trapped in the upper portion of the water chamber, substantially as described.

2. A coffee pot integrally formed of vitreous material and comprising an upper bowl shaped chamber for coffee and a lower chamber of generally globular formation communicating with the upper chamber, the lower chamber terminating at one side in a laterally opening spout, and the base of the pot, below and partially around the globular lower chamber, constituting a water chamber, the wall of the globular lower chamber protruding downwardly into the water chamber to afford a water seal adapted to trap air in the upper portion of the water chamber when water is admitted, a discharge passage for boiling water leading upwardly from the water chamber and terminating above the upper bowl shaped chamber and adapted to provide for the discharge of water under pressure of steam trapped in the upper portion of the water chamber, and an integrally formed laterally positioned handle provided with a water inlet passage leading from its upper portion to the water chamber, substantially as described.

3. A coffee pot integrally formed of vitreous material and comprising an upper bowl shaped chamber for coffee and a lower chamber of generally globular formation communicating with the upper chamber, the lower chamber terminating at one side in a laterally opening spout, and the base of the pot, below and partially around the globular lower chamber, constituting a water chamber, the wall of the globular lower chamber protruding downwardly into the water chamber to afford a water seal adapted to trap air in the upper portion of the water chamber when water is admitted, a discharge passage for boiling water leading upwardly from the water chamber and terminating above the upper bowl shaped chamber and adapted to provide for the discharge of water under pressure of steam trapped in the upper portion of the water chamber, an integrally formed laterally positioned handle provided with a water inlet passage leading from its upper portion to the water chamber, and a hinged lid provided with a plug adapted when the lid is lowered to close the upper end of the water inlet passage, substantially as described.

4. A coffee pot comprising an upper chamber for coffee and a lower chamber of generally globular formation communicating with the upper chamber through a central orifice of reduced diameter, the lower chamber terminating at one side in a laterally opening spout and the base of the pot below and partially around the globular lower chamber constituting a water chamber, the wall of the lower globular chamber protruding downwardly below the base of the spout into the water chamber to afford a water seal adapted to trap air in the upper portion of the water chamber when water is admitted, and a discharge passage for boiling water leading upwardly from the water chamber and terminating above the upper chamber and adapted to provide for the discharge of water under pressure of steam trapped in the upper portion of the water chamber, substantially as described.

5. A coffee pot comprising an upper chamber for coffee and a lower chamber of generally globular formation communicating with the upper chamber through a central orifice of reduced diameter, the lower chamber terminating at one side in a laterally opening spout and the base of the pot below and partially around the globular lower chamber constituting a water chamber, the wall of the lower globular chamber protruding downwardly below the base of the spout into the water chamber to afford a water seal adapted to trap air in the upper portion of the water chamber when water is admitted, a discharge passage for boiling water leading upwardly from the water chamber and terminating above the upper chamber and adapted to provide for the discharge of water under pressure of steam trapped in the upper portion of the water chamber, and an integrally formed laterally positioned handle provided with a water inlet passage leading from its upper portion to the water chamber, substantially as described.

6. A coffee pot comprising an upper chamber for coffee and a lower chamber of generally globular formation communicating with the upper chamber through a central orifice of reduced diameter, the lower chamber terminating at one side in a laterally opening spout and the base of the pot below and partially around the globular lower chamber constituting a water chamber, the wall of the lower globular chamber protruding downwardly below the base of the spout into the water chamber to afford a water seal adapted to trap air in the upper portion of the water chamber when water is admitted, a discharge passage for boiling water leading upwardly from the water chamber and terminating above the upper chamber and adapted to provide for the discharge of water under pressure of steam trapped in the upper portion of the water chamber, an integrally formed laterally positioned handle provided with a water inlet passage leading from its upper portion to the water chamber, and a hinged lid provided with a plug adapted when the lid is lowered to close the upper end of the water inlet passage, substantially as described.

BURTON R. HERRING.